United States Patent [19]
Kubota et al.

[11] 3,871,960
[45] Mar. 18, 1975

[54] METHOD OF PRODUCING L-LYSINE BY FERMENTATION

[75] Inventors: Koji Kubota; Yasuhiko Yoshihara, both of Kawasaki; Hiroshi Okada, Tokyo, all of Japan

[73] Assignee: Ajinomoto Co., Inc., Tokyo, Japan

[22] Filed: Sept. 25, 1973

[21] Appl. No.: 400,552

[30] Foreign Application Priority Data
Oct. 9, 1972   Japan.............................. 47-101446

[52] U.S. Cl. ................................................. 195/29
[51] Int. Cl............................................. C12d 1/00
[58] Field of Search................ 195/28 R, 29, 30, 47

[56] References Cited
UNITED STATES PATENTS
3,700,557   10/1972   Nakayama et al.................... 195/29
3,707,441   12/1972   Shiro et al. ....................... 195/30 X
3,708,395   1/1973    Nakayama et al.................... 195/29

FOREIGN PATENTS OR APPLICATIONS
1,533,688   7/1968   France................................. 195/29

Primary Examiner—Lionel M. Shapiro
Assistant Examiner—Robert J. Warden
Attorney, Agent, or Firm—Hans Berman; Kurt Kelman

[57] ABSTRACT

Strains of the genus Corynebacterium which combine resistance to feedback inhibition by S-(2-aminoethyl)-L-cysteine with methionine sensitivity and additionally may require proline or arginine, produce a large amount of L-lysine by fermentation of otherwise conventional culture media.

4 Claims, No Drawings

METHOD OF PRODUCING L-LYSINE BY FERMENTATION

This invention relates to the production of L-lysine, and more particularly to a method of producing L-lysine by fermentation.

An object of the present invention is the production of L-lysine at low cost from readily available raw materials. L-lysine is indispensable for human and animal nutrition.

L-lysine has been produced heretofore by fermentation relying on three types of bacteria. The first type requires for its growth amino acids related to the biosynthesis of L-lysine and is exemplified by a homoserine-requiring mutant of Micrococcus glutamicus disclosed in U.S. Pat. No. 2,979,439. The second type includes mutants whose growth is inhibited by threonine or methionine in amounts by which the growth of the wild strain is not inhibited, and mutants having threonine or methionine-sensitivity together with a nutrient requirement for threonine (French Pat. No. 1,533,688). The third type is characterized by resistance to S-(2-aminoethyl)-L-cysteine (hereinafter abbreviated as AEC) which is a sulfur analogue of L-lysine as disclosed in U.S. Pat. No. 3,707,441.

We now have found that mutants of Corynebacterium combining resistance to feedback inhibition by lysine and its analogues such as AEC in concentrations of 1 mg/ml or more with methionine sensitivity or methionine sensitivity and a nutrient requirement for proline and or arginine, produce large amounts of L-lysine in a culture medium.

The methionine sensitivity of the mutants employed in the present invention is different from that of the threonine- or methionine-sensitive mutant raised in French Pat. No. 1,533,688. That is, the growth of the mutant in said French patent is inhibited by threonine or methionine, in the medium under conditions in which the growth of the wild strain is not inhibited. The growth inhibition by threonine is overcome by addition of methionine, and the inhibition by methionine is overcome by addition of threonine. On the other hand, the methionine sensitive strains of the present invention, are inhibited by methionine but not by threonine and the growth inhibition by methionine is not overcome by addition of threonine.

There has not been known up to now a lysine producer having this kind of methionine sensitivity.

The mutants of the invention are derived by means of conventional mutagenic agents from parent strains of the genus Corynebacterium, and by screening of the mutants so produced for the necessary resistance, sensitivity, and nutrient requirement.

EXPERIMENT

I. Cells of Micrococcus glutamicus ATCC13032 (the taxonomical denomination of this strain was recently changed to Corynebacterium glutamicum) were treated with 250 $\mu$g/ml nitrosoguanidine at 30°C for 30 minutes, and thereafter inoculated on agar flat plates and cultured at 31°C for 4 to 10 days.

COMPOSITION OF THE MEDIUM 2 percent glucose, 0.3 percent urea, 1 percent $(NH_4)_2SO_4$, 0.1 percent $KH_2PO_4$, 0.04 percent $MgSO_4 \cdot 7H_2O$, 2 ppm $Fe^{++}$, 2 ppm $Mn^{++}$, 50 $\mu$g/l biotin, 100 $\mu$g/l thiamine HCl, 0.3 percent threonine, 0.3 percent AEC and 2 percent agar, pH7.0.

We could find many mutant strains which have an ability to produce L-lysine among the colonies appearing on the plates after cultivation. Strain AJ3400 was isolated as a good lysine producer and was found to be resistant AEC and sensitive to methionine.

The strain AJ3400 which was previously cultured on a bouillon agar slant at 31°C for 24 hours was suspended in 3 ml of a basic medium.

0.1 ml batches of said suspension were added to respective 3 ml batches of a basic medium supplemented with 0.04 percent of amino acid as shown in Table 1, and cultivation was carried out at 31°C for 24 hours. The growth of the strain in each medium was examined by measuring light absorbancy at 562 m$\mu$ of the cultured broth which was diluted to 26 times its initial volume and whose calcium carbonate content was dissolved by addition of HCl.

COMPOSITION OF THE BASIC MEDIUM 2 percent glucose, 1 percent $(NH_4)_2SO_4$, 0.1 percent $KH_2PO_4$, 0.04 percent $MgSO_4 \cdot 7H_2O$, 2 ppm $Fe^{++}$, 2 ppm $Mn^{++}$, 50 $\mu$g/l biotin, 200 $\mu$g/l thiamine HCl and 2 percent calcium carbonate, pH7.0.

Table 1

| Amino acid added | Growth ($OD_{562}$) | Relative growth |
| --- | --- | --- |
| None | 0.345 | 100 |
| L-arginine | 0.317 | 92 |
| L-cysteine.HCl | 0.384 | 111 |
| L-histidine | 0.314 | 91 |
| L-isoleucine | 0.270 | 78 |
| L-leucine | 0.268 | 78 |
| L-methionine | 0.051 | 15 |
| L-phenylalanine | 0.415 | 120 |
| L-threonine | 0.280 | 82 |
| L-threonine + L-methionine | 0.040 | 11 |

II The strain AJ3400 which was previously cultured on a bouillon agar slant at 31°C for 24 hours was inoculated into 3 ml batches of the basic medium described below and supplemented with L-methionine and/or L-threonine in varying amounts as shown in Table 2, and was cultured at 31°C for 24 hours. The number of cells in the medium at the beginning of the cultivation was $5 \times 10^8$ cells/ml.

The optical density (OD) of each cultured broth was determined by measuring light absorbancy at 562 m$\mu$ of the solution prepared by adding 5 ml of water and one drop of conc. HCl to 0.2 ml of the broth. The results are shown in Table 2.

COMPOSITION OF THE BASIC MEDIUM 2 percent glucose, 1 percent $(NH_4)_2SO_4$, 0.1 percent $KH_2PO_4$, 0.04 percent $MgSO_4 \cdot 7H_2O$, 2 ppm $Fe^{++}$, 2 ppm $Mn^{++}$, 50 $\mu$g/l biotin, 200 $\mu$g/l thiamine HCl, 0.05 percent NaCl and 2 percent calcium carbonate, pH7.0.

Table 2

| L-Methionine added (mM/l) | L-Threonine added (mM/l) | Growth (OD) |
| --- | --- | --- |
| 0 | — | 0.450 |
| 0.03 | — | 0.283 |
| 0.1 | — | 0.054 |
| 0.3 | — | 0.047 |
| 1.0 | — | 0.040 |
| 3.0 | — | 0.040 |
| 3.0 | 3.0 | 0.042 |
| 3.0 | 30 | 0.040 |
| 3.0 | 100 | 0.042 |

The strain AJ3400 could not grow in a medium containing more than 0.1 mM/l (14.9 mg/l) of L-methionine during 24 hours' cultivation.

However, the parent strain Micrococcus glutamicus ATCC13032 could grow well in a medium containing more than 50 mM (7,450 mg/l) of L-methionine during 24 hours' cultivation.

(III) The strain AJ3400 was again treated with 250 μg/ml of nitrosoguanidine at 30°C for 30 minutes. After said treatment, mutant strains having some nutrient requirement were isolated by the known replication method. Mutant strains AJ3609, which combines an arginine requirement with resistance to AEC and sensitivity to methionine, and AJ3610 which requires proline were obtained as good L-lysine producers.

Based on the results shown in above mentioned Experiment, we define a methionine sensitive microorganism for the present invention as a strain whose growth during 24 hours' cultivation on a minimal medium supplemented with 0.1 millimole of L-methionine, is inhibited severely and whose growth inhibition by L-methionine is not overcome by addition of L-threonine.

The three strains described were deposited as Corynebacterium glutamicum AJ3400 (FERM P 1639), AJ3609 (FERM P 2278) and AJ3610 (FERM P 2279). At the Fermentation Research Institute, Agency of Industrial Science and Technology, Minstry of International Trade and Industry, of No. 1-8-5, Inagehigashi, Chiba-shi, Chiba-ken, Japan.

A synthetic culture medium or a natural nutrient medium is suitable for cultivation of the strains employed in the present invention as long as it contains the essential nutrients for the growth of the strain employed which and include a carbon source, a nitrogen source and inorganic compounds in appropriate amounts.

As a carbon source, there may be used carbohydrates such as glucose, fructose, maltose, sucrose, starch, starch hydrolysate, molasses, etc., or as organic acids, for example, acetic acid, propionic acid, fumaric acid, benzoic acid, or alcohols, for example, ethanol. These substances may be used either singly or in mixtures.

Depending upon the microorganism employed, it is possible to use hydrocarbons in major or minor amount in a major or minor fermentation medium as the source of carbon.

As a nitrogen source, urea or ammonium salts such as ammonium chloride, ammonium sulfate, ammonium nitrate, ammonium phosphate, amino acids, or other natural substances containing nitrogen, such as cornsteep liquor, yeast extract, meat extract, fish meal, peptone, bouillon, casein hydrolysates, fish solubles, rice bran extract, etc. may be employed. These substances may also be used either singly or in combinations.

Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, sodium chloride, etc.

Minor nutrients necessary for the growth of the mutant should be present in the culture medium. The growth promoting agents and minor nutrients which improve the yield and the rate of production of L-lysine include amino acids, various vitamins, soy protein hydrolyzate, yeast extract, corn steep liquor, peptone, casein hydrolyzate and so on.

In order to obtain a good yield of lysine, the fermentation is preferably carried out aerobically with aeration and agitation. Best yields require pH control within the range of 5 to 9. The desired pH may be maintained by means of gaseous or aqueous ammonia, calcium carbonate, alkali metal hydroxides, urea, or organic or inorganic acids.

When the fermentation is carried out at 24° to 37°C, the maximum concentration of L-lysine in the broth is usually reached within 2 to 7 days.

The lysine accumulated in fermentation broth can be recovered by conventional methods, as by adsorption on an ion exchange resin and precipitation from the eluate.

The amount of lysine produced in the cultured broth was determined by a colorimetric method based on acidic-copper ninhydrin reaction.

The following Examples are illustrative of the present invention.

EXAMPLE 1

20 Ml batches of a medium containing 10 percent glucose, 4.5 percent $(NH_4)_2SO_4$, 0.1 percent $KH_2PO_4$, 0.04 percent $MgSO_4 \cdot 7H_2O$, 2 ppm $Mn^{++}$, 2 ppm $Fe^{++}$, 50 μg/l biotin, 200 μg/l thiamine HCl, and 5 percent calcium carbonate (sterilized separately), and of pH7.0, were placed in separate 500 ml shaking flasks, and sterilized.

Corynebacterium glutamicium AJ3400 (FERM P 1638) previously cultured on bouillon agar slants was introduced into the flasks, and cultured at 31°C with aeration and agitation for 72 hours. The cultureed broth was found to contain 3.1 g/dl lysine and centrifuged. One liter of the supernatant liquid was passed through a column packed with an ion exchange resin, Amberlite IR-120 ($H^+$ type), and lysine was eluted with 3 percent aqueous ammonia. The eluate was concentrated under reduced pressure.

Hydrochloric acid was added to the concentrated solution which was then, cooled in an ice box to precipitate L-lysine, and 20.7 g of crude crystalline L-lysine hydrochloride dihydrate was obtained.

EXAMPLE 2

Corynebacterium glutamicum AJ3400 (FERM P 1638), AJ3609 (FERM P 2278) and AJ3610 (FERM P2279) were cultured in respective batches of the medium mentioned in Example 1 supplemented with 1.5 percent of soy protein hydrolyzate (total nitrogen: 7 percent) in the same manner as in Example 1.

The cultured broths were found to contain 3.53 g/dl, 3.8 g/dl and 4.2 g/dl lysine respectively.

EXAMPLE 3

Corynebacterium glutamicum AJ3400 was cultured on a seed culture medium having the following composition, at 31°C for 18 hours under aeration and agitation:

1.5 percent glucose, 0.3 percent ammonium acetate, 0.1 percent urea, 0.1 percent $KH_2PO_4$, 0.04 percent $MgSO_4 \cdot 7H_2O$, 2 ppm $Fe^{++}$, 2 ppm $Mn^{++}$, 50 µg/l biotin, 200 µg/l thiamine HCl, and 2 percent soy protein hydrolyzate (total nitrogen: 7 percent), pH7.0.

300 Ml batches of the following main culture medium were placed in separate one liter glass jar fermentors, and sterilized by heating. 15 ml Inocula of the seed culture broth were introduced into the main culture medium and cultivation was started at 31°C with stirring while an equal volume of air was introduced per minute.

MAIN CULTURE MEDIUM 3 percent glucose, 0.5 percent ammonium acetate, 0.2 urea, 0.2 percent $KH_2PO_4$, 0.04 percent $MgSO_4 \cdot 7H_2O$, 2 ppm $Fe^{++}$, 2 ppm $Mn^{++}$, 50 µg/l biotin, 50 µg/l thiamine HCl, and 2 percent soy protein hydrolyzate (total nitrogen: 7 percent), pH7.5.

Cultivation was continued at 31° – 33°C, the pH of the medium was maintained between 7.2 and 8.0 by feeding a 60% solution of acetic acid, which contained 0.25 mole of ammonium acetate per mole of acetic acid.

After 52 hours' cultivation, 5.4 g/dl of L-lysine were found in the cultured broth (the total amount of acetic acid added to the medium and consumed was 20 percent based on the initial volume of the medium).

35.7 G of L-lysine hydrochloride dihydrate were obtained from one liter of cultured broth by the method mentioned in Example 1.

EXAMPLE 4

Corynebacterium glutamicum AJ3400 was cultured on the seed culture medium of in Example 3, at 31°C for 18 hours with aeration and agitation.

300 Ml batches of a main culture medium having the indicated below composition were placed in separate one liter glass jar fermentors, and sterilized. 15 Ml batches of the seed culture broth were added to respective batches of the main culture medium and cultivation was started under the same condition as in Example 3.

MAIN CULTURE MEDIUM 2 percent glucose, 1 percent ethanol, 0.5 percent $(NH_4)_2SO_4$, 0.2 percent urea, 0.1 percent $KH_2PO_4$, 0.04 percent $MgSO_4 \cdot 7H_2O$, 2 ppm $Fe^{++}$, 2 ppm $Mn^{++}$, 50 µg/l biotin, 50 µg/l thiamine HCl, and 2 percent soy protein hydrolyzate (total nitrogen: 7 percent), and pH7.5.

During the fermentation, the pH of the medium was maintained between 7.2 and 7.8 by introducing gaseous ammonia. The amount of residual ethanol in the medium was determined by gas chromatography, and ethanol was fed to the medium when the residual ethanol decreased to about 0.3 percent.

After 48 hours' cultivation at 31° – 33°C. 4.1 g/dl of L-lysine were found in the cultured broth (the total amount of ethanol consumed was 17 percent based on the initial volume of the medium).

29.6 G of L-lysine hydrochloride dihydrate were obtained from one liter of cultured broth as in Example 1.

EXAMPLE 5

Corynebacterium glutamicum AJ3400, AJ3609 and AJ3610 were cultured in media respectively containing beet molasses or cane molasses as carbon source, under the conditions of Example 1.

Composition of the culture medium:

| | | |
|---|---|---|
| Beet molasses or cane molasses (calculated as glucose) | 10 | % |
| $(NH_4)_2SO_4$ | 4.5 | % |
| $KH_2PO_4$ | 0.1 | % |
| $MgSO_4 \cdot 7H_2O$ | 0.04 | % |
| $Fe^{++}$ | 2 | ppm |
| $Mn^{++}$ | 2 | ppm |
| biotin | 50 | µg/l |
| thiamine HCl | 200 | µg/l |
| calcium carbonate (sterilized separately) | 5 | % |
| soy protein hydrolyzate (total nitrogen: 7%) | 1.5 | % |

(pH 7.0)

The amount of L-lysine (as hydrochloride) accumulated in each medium was as follows:

| | L-lysine accumulated (g/dl) | |
|---|---|---|
| | Beet molasses | Cane molasses |
| AJ3400 | 3.4 | 3.3 |
| AJ3609 | 4.3 | 4.0 |
| AJ3610 | 4.5 | 4.2 |

What we claim is:

1. A method of producing L-lysine which comprises:
   a. culturing a lysine-producing strain of Corynebacterium under aerobic conditions in an aqueous medium containing assimilable sources of carbon and nitrogen, inorganic salts and organic substances required for the growth of said strain at pH 5 to 9 until L-lysine accumulates in said medium; and
   b. recovering the accumulated lysine from said medium,
      1. said strain being resistant to feedback inhibition by 1 mg/ml S-(2-aminoethyl)-L-cysteine,
      2. the growth of said strain being severely inhibited during 24 hours cultivation on a minimal medium when said minimal medium is supplemented with 0.1 millimole per liter methionine, and
      3. the inhibition of said growth by said methionine not being overcome by addition of L-threonine in any amount up to 100 millimole per liter.

2. A method as set forth in claim 1, wherein said strain further requires at least one amino acid selected from the group consisting of proline and arginine.

3. A method as set forth in claim 1, wherein said strain is a mutant strain of Corynebacterium glutamicum.

4. A method of producing L-lysine which comprises culturing Corynebacterium glutamicum FERM P1638, FERM P 2278, or FERM P 2279 under aerobic condition in an aqueous medium containing assimilable sources of carbon and nitrogen, inorganic salts and organic substances required for the growth of said Corynebacterium glutamicum at pH 5 to 9 until L-lysine accumulates in said medium; and recovering the accumulated lysine from said medium.

* * * * *